US012206170B2

(12) United States Patent
Kim et al.

(10) Patent No.: US 12,206,170 B2
(45) Date of Patent: Jan. 21, 2025

(54) ANTENNA DEVICE

(71) Applicant: DONGWOO FINE-CHEM CO., LTD., Jeollabuk-do (KR)

(72) Inventors: Young Ju Kim, Gyeonggi-do (KR); Sung Hoe Kim, Seoul (KR); Hee Jun Park, Gyeonggi-do (KR); Young Sub Son, Seoul (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 196 days.

(21) Appl. No.: 18/118,868

(22) Filed: Mar. 8, 2023

(65) Prior Publication Data

US 2023/0299496 A1 Sep. 21, 2023

(30) Foreign Application Priority Data

Mar. 15, 2022 (KR) ........................ 10-2022-0031973

(51) Int. Cl.

| | |
|---|---|
| ***H01Q 15/16*** | (2006.01) |
| ***H01Q 1/22*** | (2006.01) |
| ***H01Q 1/42*** | (2006.01) |

(52) U.S. Cl.

CPC ......... *H01Q 15/168* (2013.01); *H01Q 1/2283* (2013.01); *H01Q 1/422* (2013.01)

(58) Field of Classification Search

CPC ........ H01Q 1/422; H01Q 1/241; H01Q 1/243; H01Q 1/36; H01Q 1/2283; H01Q 5/25; H01Q 9/40; H01Q 15/168

See application file for complete search history.

(56) References Cited

FOREIGN PATENT DOCUMENTS

| | | | | |
|---|---|---|---|---|
| JP | 2008-219125 A | | 9/2008 | |
| KR | 10-2019-0009232 A | | 1/2019 | |
| WO | WO-2021049885 A1 | * | 3/2021 | ............. H01Q 1/242 |
| WO | WO-2022045696 A1 | * | 3/2022 | ............... H01Q 1/38 |

* cited by examiner

*Primary Examiner* — Hoang V Nguyen

(74) *Attorney, Agent, or Firm* — The PL Law Group, PLLC

(57) ABSTRACT

An antenna device according to an embodiments of the present invention includes a substrate layer, a ground layer disposed on a bottom surface of the substrate layer, a radiation control layer disposed on a top surface of the substrate layer, the radiation control layer including a plurality of radiation control patterns formed of a conductive mesh structure, each of the radiation control patterns having a hollow portion, an antenna dielectric layer disposed on the radiation control layer, and an antenna unit disposed on the antenna dielectric layer.

18 Claims, 13 Drawing Sheets

ANTENNA DEVICE

CROSS-REFERENCE TO RELATED APPLICATION AND CLAIM OF PRIORITY

This application claims the benefit under 35 USC § 119 of Korean Patent Application No. 10-2022-0031973 filed on Mar. 15, 2022 in the Korean Intellectual Property Office (KIPO), the entire disclosure of which is incorporated herein by reference for all purposes.

BACKGROUND

1. Field

The present invention relates to an antenna device. More particularly, the present invention relates to an antenna device including an antenna unit operable in a plurality of frequency bands.

2. Description of the Related Art

As information technologies have been developed, a wireless communication technology such as Wi-Fi, Bluetooth, etc., is combined or embedded in an image display device, an electronic device, an architecture, etc.

As mobile communication technologies have been rapidly developed, an antenna capable of operating a high frequency or ultra-high frequency communication is being applied to public transportations such as a bus and a subway, a building structure, and various mobile devices.

Accordingly, implementation of radiation properties in a plurality of frequency bands from a single antenna device may be needed. In this case, a high frequency antenna and a low frequency antenna may be included in a single device.

However, if antennas of different frequency bands are disposed to be adjacent to each other, radiation and impedance characteristics of the different antennas may collide with each other and may be disturbed.

Further, when the antennas of different frequency bands are arranged to be separated from each other, a space for the arrangement of the antennas may be increased to degrade spatial efficiency and aesthetic properties of a structure to which an antenna device is applied.

Additionally, the radiation may be disturbed and performance of the antenna may be degraded by a reflected wavelength by a conductive material and/or a ground included in an object to which the antenna is attached.

Thus, design of an additional element to improve gain and radiation reliability of the antenna may be needed.

For example, Korean Published Patent Application No. 2019-0009232 discloses an antenna module integrated into a display panel. However, a broadband antenna with improved radiation reliability is not disclosed.

SUMMARY

According to an aspect of the present invention, there is provided an antenna device having improved radiation property and reliability.

(1) An antenna device, including: a substrate layer; a ground layer disposed on a bottom surface of the substrate layer; a radiation control layer disposed on a top surface of the substrate layer, the radiation control layer including a plurality of radiation control patterns formed of a conductive mesh structure, each of the radiation control patterns having a hollow portion; an antenna dielectric layer disposed on the radiation control layer; and an antenna unit disposed on the antenna dielectric layer.

(2) The antenna device according to the above (1), wherein the antenna dielectric layer includes a first dielectric layer directly contacting a bottom surface of the antenna unit, and a second dielectric layer disposed on a bottom surface of the first dielectric layer, and a thickness of the second dielectric layer is greater than a thickness of the first dielectric layer.

(3) The antenna device according to the above (2), wherein the thickness of the second dielectric layer is in a range from 1 mm to 10 mm.

(4) The antenna device according to the above (1), wherein an area where the antenna unit and the radiation control patterns overlap in a plan view is 50% or more of a total area of the antenna unit.

(5) The antenna device according to the above (1), wherein the antenna unit includes: a radiator including a plurality of radiating portions, width of which are sequentially reduced; a transmission line electrically connected to the radiator; and a ground pattern disposed around the transmission line and physically spaced apart from the radiator and the transmission line.

(6) The antenna device according to the above (5), wherein the plurality of radiating portions include a first radiating portion, a second radiating portion and a third radiating portion, widths of which are sequentially reduced.

(7) The antenna device according to the above (6), wherein the first radiating portion, the second radiating portion and the third radiating portion are arranged in a stepped shape, and the transmission line is directly connected to the third radiating portion.

(8) The antenna device according to the above (6), wherein a length of the first radiating portion, a length of the second radiating portion and a length of the third radiating portion are different from each other.

(9) The antenna device according to the above (5), wherein the ground pattern includes a pair of ground patterns facing each other with the transmission line interposed therebetween and each including a protrusion.

(10) The antenna device according to the above (9), wherein each of the pair of ground patterns includes a ground portion extending in a width direction around the transmission line, and the protrusion extends from the ground portion toward the radiator in an extending direction of the transmission line.

(11) The antenna device according to the above (5), wherein the ground pattern includes a second portion having a lateral side inclined toward the transmission line, a first portion extending from the second portion toward the radiator in an extending direction of the transmission line, and a third portion protruding from the second portion and including an alignment mark.

(12) The antenna device according to the above (1), wherein the radiation control layer further includes: a first dummy mesh pattern surrounding peripheries of the radiation control patterns; and a second dummy mesh pattern disposed in the hollow portion formed in each of the radiation control patterns.

(13) The antenna device according to the above (12), wherein each of the first dummy mesh pattern and the second dummy mesh pattern includes dummy conductive lines crossing each other to form a mesh structure, and segmented regions where the dummy conductive lines are cut.

(14) An antenna device, including: a substrate layer; a radiation control layer disposed on a top surface of the substrate layer, the radiation control layer including a plurality of first patterns each having a conductive mesh structure and a second pattern spaced apart from the first patterns to surround the first patterns; an antenna dielectric layer disposed on the radiation control layer; and an antenna unit disposed on the antenna dielectric layer.

(15) The antenna device according to the above (14), wherein the second pattern has a conductive mesh structure.

(16) The antenna device according to the above (14), wherein the radiation control layer further includes a third dummy mesh pattern disposed between the first patterns and the second pattern.

(17) The antenna device according to the above (16), wherein the third dummy mesh pattern has a hollow circle shape.

(18) The antenna device according to the above (14), wherein a ground layer is not disposed on a bottom surface of the substrate layer.

According to embodiments of the present invention, an antenna device may include an antenna unit and a radiation control layer. Accordingly, radiation performance at a target frequency may be enhanced while implementing multi-band radiation.

In some embodiments, the antenna unit may include a plurality of radiating portions, widths of which may be sequentially reduced. Thus, a multi-band antenna capable of providing a multi-band signal transmission/reception may be implemented in a single radiator.

In some embodiments, the radiation control layer may include a plurality of radiation control patterns, each of which includes a conductive mesh pattern including a hollow. In this case, a re-reflection or a phase change of a wavelength reflected from a ground layer may occur by the radiation control layer. Accordingly, a destructive interference between an antenna radiation wavelength and a ground layer reflection wavelength may be prevented or a constructive interference may be induced. Thus, an antenna gain may be increased and radiation reliability may be improved.

In some embodiments, the radiation control layer may include a plurality of first patterns, and second patterns spaced apart from the first patterns and surrounding each of the first patterns. The first patterns and the second patterns may include conductive mesh patterns. In this case, the radiation control layer may serve as a filter that may only transmit in a target frequency band. Accordingly, a degree of radiation concentration may be improved, and antenna performance may be enhanced.

DETAILED DESCRIPTION OF THE EMBODIMENTS

According to exemplary embodiments of the present invention, an antenna device including an antenna unit and a radiation control layer is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "upper", "lower", "top" and "bottom" used herein are intended to designate relative positions of each component, and are not intended to limit an absolute position.

Figure 1:
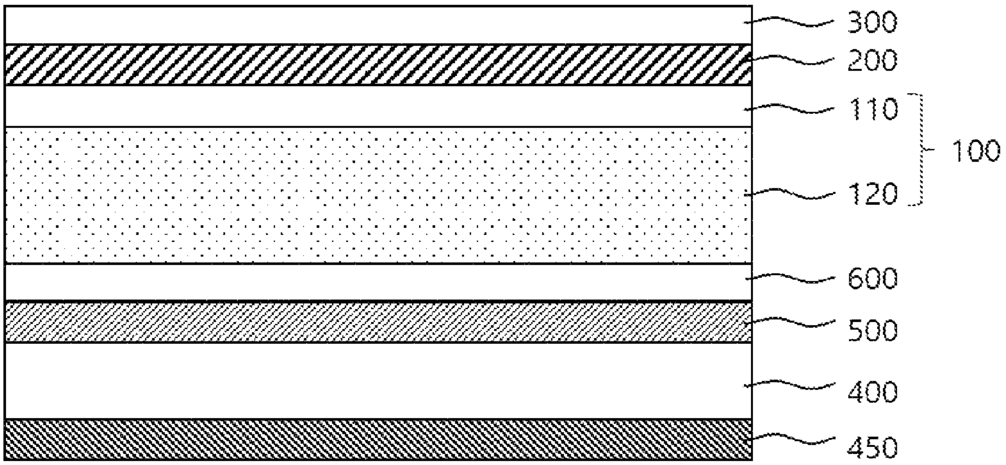
FIG. 1 is a schematic cross-sectional view illustrating an antenna device in accordance with exemplary embodiments.

FIG. 1 is a schematic cross-sectional view illustrating an antenna device in accordance with exemplary embodiments.

Referring to FIG. 1, an antenna device may include a substrate layer 400, a ground layer 450 disposed on a bottom surface of the substrate layer 400, a radiation control layer 500 disposed on a top surface of the substrate layer 400 and including a plurality of radiation control patterns 510, an antenna dielectric layer 100 disposed on the radiation control layer 500, and an antenna unit 200 disposed on the antenna dielectric layer 100.

The antenna dielectric layer 100 may include, e.g., a transparent resin material. For example, the antenna dielectric layer 100 may include a polyester-based resin such as polyethylene terephthalate, polyethylene isophthalate, polyethylene naphthalate and polybutylene terephthalate; a cellulose-based resin such as diacetyl cellulose and triacetyl cellulose; a polycarbonate-based resin; an acrylic resin such as polymethyl (meth)acrylate and polyethyl (meth)acrylate; a styrene-based resin such as polystyrene and an acrylonitrile-styrene copolymer; a polyolefin-based resin such as polyethylene, polypropylene, a cycloolefin or polyolefin having a norbomene structure and an ethylene-propylene copolymer; a vinyl chloride-based resin; an amide-based resin such as nylon and an aromatic polyamide; an imide-based resin; a polyethersulfone-based resin; a sulfone-based resin; a polyether ether ketone-based resin; a polyphenylene sulfide resin; a vinyl alcohol-based resin; a vinylidene chloride-based resin; a vinyl butyral-based resin; an allylate-based resin; a polyoxymethylene-based resin; an epoxy-based resin; a urethane or acrylic urethane-based resin; a silicone-based resin, etc. These may be used alone or in a combination thereof.

In some embodiments, an adhesive film such as an optically clear adhesive (OCA), an optically clear resin (OCR), etc., may be included in the antenna dielectric layer 100.

In some embodiments, the antenna dielectric layer 100 may include an inorganic insulating material such as glass, silicon oxide, silicon nitride, silicon oxynitride, etc.

Impedance or inductance for the antenna unit 200 may be generated by the antenna dielectric layer 100, so that a frequency band at which the antenna device may be driven or operated may be adjusted. In some embodiments, an overall dielectric constant of the antenna dielectric layer 100 may be adjusted in a range from about 1.5 to about 12. When the dielectric constant exceeds about 12, a driving frequency may be excessively decreased and driving in a desired high frequency band may not be implemented.

In some embodiments, the antenna dielectric layer 100 may be formed as a multi-layer structure including a first dielectric layer 110 directly contacting a bottom surface of the antenna unit 200 and a second dielectric layer 120 disposed on a bottom surface of the first dielectric layer 110.

In some embodiments, a thickness of the second dielectric layer 120 may be greater than a thickness of the first dielectric layer 110. Accordingly, radiation performance of the antenna unit 200 may be sufficiently achieved.

In some embodiments, the thickness of the second dielectric layer 120 may be in a range from 1 mm to 10 mm. Within the thickness range, an excessive increase of a thickness of the antenna device may be prevented while improving an antenna gain from the antenna unit 200.

In an embodiment, a maximum antenna gain may increase as the thickness of the second dielectric layer 120 increases within a range from 1 mm to 10 mm.

For example, the first dielectric layer 110 and the second dielectric layer 120 may be formed of different materials.

In an embodiment, a polystyrene sheet (PS Sheet) may be used as the second dielectric layer 120.

Figure 2:
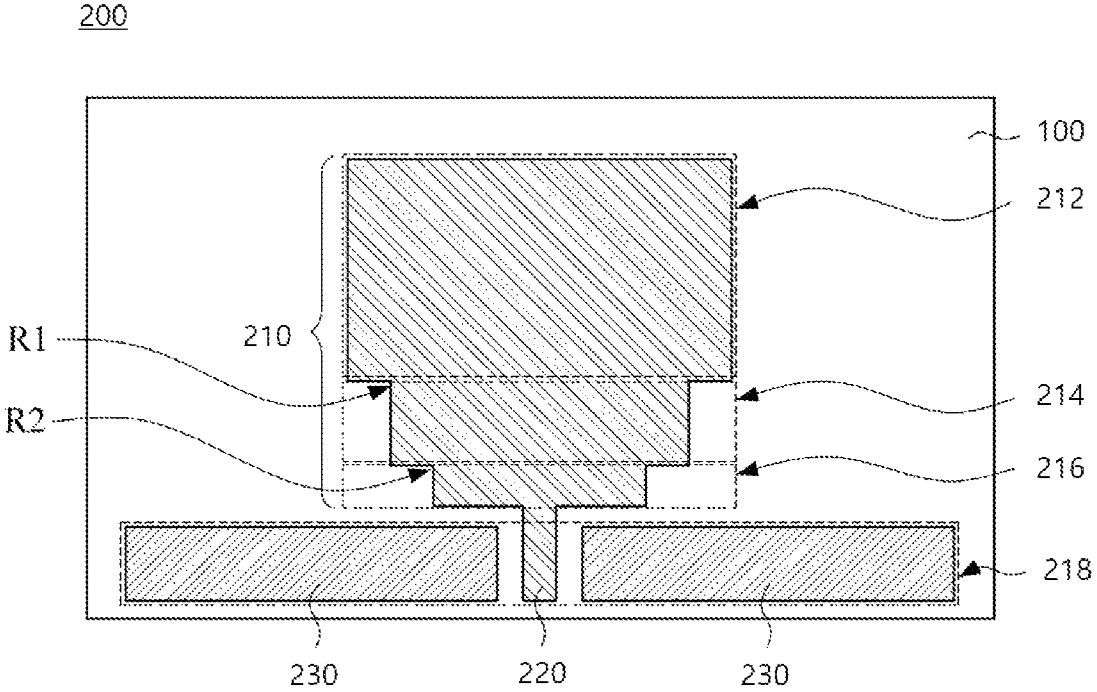
FIG. 2 is a schematic plan view illustrating an antenna unit in accordance with exemplary embodiments.

FIG. 2 is a schematic plan view illustrating an antenna unit in accordance with exemplary embodiments.

Referring to FIG. 2, an antenna unit 200 may include a radiator 210 and a transmission line 220 electrically connected to the radiator 120.

In exemplary embodiments, the antenna unit 200 may include a ground pattern 230 disposed around the transmission line 220 to be physically separated from the radiator 210 and the transmission line 220.

In exemplary embodiments, the radiator 210 may include a plurality of radiating portions, widths of which may be sequentially decreased. Accordingly, a multi-band antenna in which a multi-band signal transmission/reception is performed may be implemented in the single radiator The term "width" as used herein may refer to a length of the radiator 210 in a horizontal direction in FIGS. 2 to 6, and 11.

In some embodiments, the plurality of radiating portions may include a first radiating portion 212, a second radiating portion 214 and a third radiating portion 216, and widths of the first radiating portion 212, the second radiating portion 214 and the third radiating portion 216 may be sequentially reduced. In a plan view, the third radiating portion 216, the second radiating portion 214 and the first radiating portion 212 may be sequentially disposed from the transmission line 220.

The first radiating portion 212 may correspond to an uppermost or an outermost portion in a length direction of the antenna unit 200 from the transmission line 220 in the plan view.

The first radiating portion 212 may be provided as a low frequency radiator of the radiator 210 or the antenna unit 200. For example, radiation of the lowest frequency band obtained by the antenna unit 200 may be implemented from the first radiating portion 212 may be implemented. For example, a resonance frequency of the first radiating portion 212 may be in a range from about 0.1 GHz to 1.4 GHz.

In an embodiment, a radiation band corresponding to an LTE1 band may be obtained from the first radiating portion 212. In an embodiment, the resonance frequency of the first radiating portion 212 may be in a range from 0.5 GHz to 1 GHz, or from 0.6 GHz to 1 GHz.

The second radiating portion 214 may serve as a first mid-band radiator of the antenna unit 200 or the radiator 210. For example, an average resonance frequency of the second radiating portion 214 may be greater than that of the first radiating portion 212. For example, the resonance frequency of the second radiating portion 214 may be in a range from about 1.5 GHz to 2.5 GHz.

In an embodiment, a radiation band corresponding to an LTE2 band may be obtained from the second radiating portion 214. For example, the resonance frequency of the second radiating portion 214 may be in a range from 1.7 GHz to 2.0 GHz.

For example, the resonance frequency range of the second radiating portion 214 may partially overlap the resonance frequency range of the third radiating portion 216.

In some embodiments, the second radiating portion 214 may have a smaller width than that of the first radiating portion 212.

In some embodiments, a first recess R1 may be formed at a boundary between the first radiating portion 212 and the second radiating portion 214. The recessed boundary may be formed, so that independent radiation properties of the first radiating portion 212 and the second radiating portion 214 may be enhanced. For example, the above-described low-frequency band radiation from the first radiator 212 may be prevented from disturbing the first mid-band radiation from the second radiating portion 214.

The third radiator 216 may serve as a second mid-band radiator having a higher resonance frequency range than that of the second radiator 214 of the antenna unit 200 or the radiator 210. For example, a resonance frequency of the third radiating portion 216 may be in a range from about 2.0 GHz to 3.0 GHz.

In an embodiment, a radiation band corresponding to an LTE2 band/2.4 GHz Wi-Fi band may be obtained from the third radiating portion 216. For example, the resonance frequency of the third radiating portion 216 may be in a range from about 2.2 GHz to 2.7 GHz.

For example, the resonance frequency range of the third radiating portion 216 may partially overlap the resonance frequency range of the second radiating portion 214.

In some embodiments, the third radiating portion 216 may have a smaller width than that of each of the first radiating portion 212 and the second radiating portion 214.

In some embodiments, a second recess R2 may be formed at a boundary between the second radiating portion 214 and the third radiating portion 216. Independence and reliability of radiation through the third radiating portion 216 may be improved by the second recess R2.

In some embodiments, the transmission line 220 may be directly connected to the third radiating portion 216.

The transmission line 220 may transmit, e.g., a driving signal or power from a driving integrated circuit (IC) chip to the radiator 210.

For example, one end portion of the transmission line 220 may be directly connected to the third radiating portion 216 to transmit the signal and power to the radiator 210. The other end portion of the transmission line 220 may be electrically connected to the driving IC chip through, e.g., an antenna cable. Accordingly, the signal transmission and reception, and the power supply from the driving IC chip to the radiator 210 may be performed.

In some embodiments, the first radiating portion 212, the second radiating portion 214 and the third radiating portion 216 may be arranged in a stepped shape. Thus, independence of a driving frequency band of each radiating portions may be improved.

In some embodiments, each lateral side of the radiating portions 212, 214 and 216 may have a straight line shape. For example, each of the first radiating portion 212, the second radiating portion 214 and the third radiating portion 216 may have a rectangular shape. Accordingly, a signal transmission between the radiating portions may be implemented while suppressing impedance disturbance. Additionally, a desired frequency band may be easily adjusted.

In an embodiment, all sides of the radiator 210 may have a straight line shape.

In some embodiments, the lateral sides of the radiating portions 212, 214 and 216 may have a straight line shape parallel to the transmission line 220. Thus, a signal efficiency may be increased by reducing a distance of the signal transmission/reception.

In some embodiments, a length of the first radiating portion 212, a length of the second radiating portion 214 and a length of the third radiating portion 216 may be different from each other. Accordingly, an interval between driving frequency bands of each radiating portion may be modified based on target frequency bands.

In some embodiments, the length of the first radiating portion 212, the length of the second radiating portion 214 and the length of the third radiating portion 216 may be sequentially decreased. In this case, an interval between the driving frequency ranges of the radiating portions may become wider. For example, a band between the driving frequency ranges of the first radiating portion 212 and the second radiating portion 214 may become wider, and a band between the driving frequency range of the second radiating portion 214 and the third radiating portion 216 may become wider. Accordingly, interference and disturbance between the driving frequency ranges may be prevented, and a resolution in each driving frequency range may be improved.

The term "length" as used herein may refer to a length in a longitudinal direction perpendicular to a horizontal direction of the radiator 210 in FIGS. 2 to 6 and 11.

In exemplary embodiments, the ground pattern 230 may be disposed around the transmission line 220 and may be spaced apart from the radiator 210 and the transmission line 220. For example, a pair of ground patterns 230 may be disposed to face each other with the transmission line 220 interposed therebetween.

In some embodiments, the ground pattern 230 may serve as an auxiliary radiator. For example, the ground pattern 230 may be electrically coupled to the radiator 210 and/or the transmission line 220 to serve as a fourth radiating portion 218.

The fourth radiating portion 218 may provide a high frequency radiation region of the antenna unit 200. For example, a radiation of the highest frequency band obtained by the antenna unit 200 may be implemented from the fourth radiating portion 218. For example, a resonance frequency of the fourth radiating portion 218 may be in a range from about 3.0 GHz to about 5.0 GHz.

In an embodiment, a radiation band corresponding to Sub-6 5G may be obtained from the fourth radiating portion 218. In an embodiment, a resonance frequency of the fourth radiating portion 218 may be in a range from about 3 GHz to 4 GHz or from about 3.1 GHz to 3.8 GHz.

An average resonance frequency of the fourth radiating portion 218 may be greater than that of the third radiating portion 216.

The above-described driving frequency bands of the first radiating portion 212, the second radiating portion 214, the third radiating portion 216 and the fourth radiating portion 218 are exemplary, and may be modified according to radiation properties of the antenna unit 200.

For example, a size/area of the radiator 210 may be adjusted according to the target frequency band. For example, the driving frequency band may be shifted to a high frequency band by reducing an entire area of the radiator 210. In this case, the first radiating portion 212 may be driven in the radiation band of the above-described second radiating portion 214, and the second radiating portion 214 may be driven in the radiation band of the third radiating portion 216 as described above. Further, the third radiating portion 216 may be driven in the radiation band of the fourth radiating portion 218 as described above, and the fourth radiating portion 218 may be driven in a high-frequency band greater than the radiation band of the fourth radiating portion 218 as described above.

A plurality of the radiating portions having different resonance frequency ranges may be included in one antenna unit 200, so that a multi-band antenna may be achieved while improving spatial efficiency.

In some embodiments, a plurality of the radiators 210 may be arranged on the antenna dielectric layer 100 to form a radiator column and/or a radiator row.

In an embodiment, two radiators 210 may be spaced apart from each other in a width direction of the antenna dielectric layer 100 on the antenna dielectric layer 100.

Figure 3:
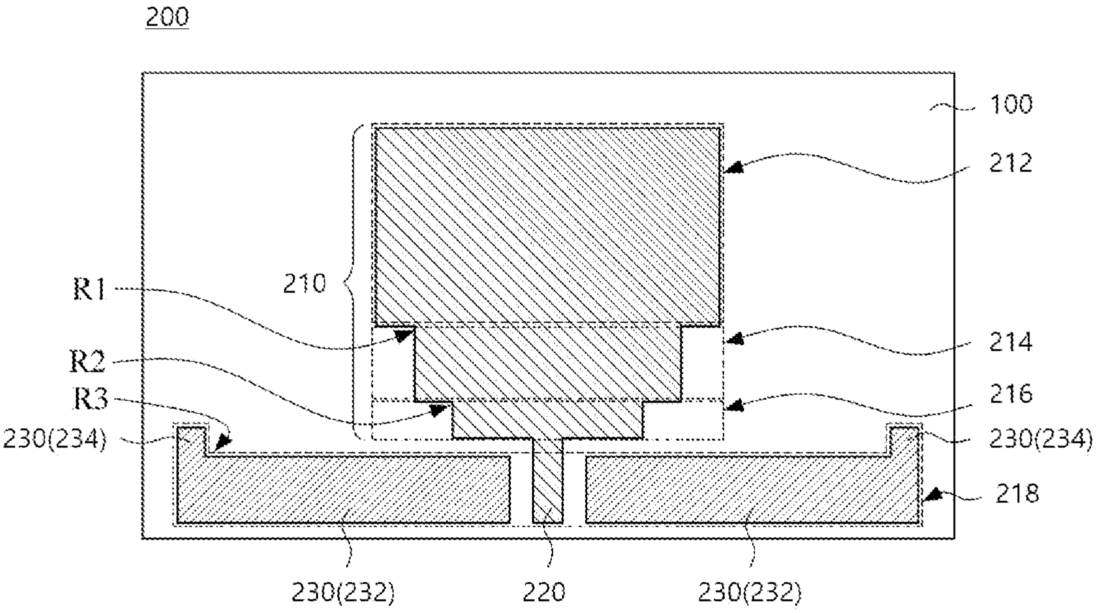
FIG. 3 is a schematic plan view illustrating an antenna unit in accordance with exemplary embodiments.

FIG. 3 is a schematic plan view illustrating an antenna unit in accordance with exemplary embodiments.

Referring to FIG. 3, the ground pattern 230 may include a ground portion 232 extending in the width direction around the transmission line 220.

For example, the ground pattern 230 may include a protrusion 234 extending from the ground portion 232 toward the radiator 210 in an extension direction of the transmission line 220. The protrusion 234 may promote formation of an electrical coupling between the ground pattern 230 and the radiator 210 and/or between the ground pattern 230 and the transmission line 220. Accordingly, a multi-band antenna structure that performs high-efficiency radiation in the high-frequency band may be formed.

For example, the protrusion 234 and the ground portion 232 may be integrally formed using the same material.

For example, disturbance/interference with the driving frequency of other radiators may be prevented by the protrusion 234. Accordingly, signal loss and disturbance in the radiation band of the fourth radiation unit 218 may be suppressed.

For example, a third recess R3 may be formed at a boundary between the ground portion 232 and the protrusion 234.

The antenna unit 200 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the antenna unit 200 may include silver (Ag) or a silver alloy (e.g., silver-palladium-copper (APC)), or copper (Cu) or a copper alloy (e.g., a copper-calcium (CuCa)) to implement a low resistance and a fine line width pattern.

The antenna unit 200 may include a transparent conductive oxide such indium tin oxide (ITO), indium zinc oxide (IZO), zinc oxide (ZnOx), indium zinc tin oxide (IZTO), etc.

In some embodiments, the antenna unit 200 may include a stacked structure of a transparent conductive oxide layer and a metal layer. For example, the antenna unit 200 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

The antenna unit 200 may include a blackened portion, so that a reflectance at a surface of the antenna unit 200 may be decreased to suppress a visual recognition of the antenna unit due to a light reflectance.

In an embodiment, a surface of the metal layer included in the antenna unit 200 may be converted into a metal oxide or a metal sulfide to form a blackened layer. In an embodiment, a blackened layer such as a black material coating layer or a plating layer may be formed on the antenna unit 200 or the metal layer. The black material or plating layer may include silicon, carbon, copper, molybdenum, tin, chromium, molybdenum, nickel, cobalt, or an oxide, sulfide or alloy containing at least one therefrom.

A composition and a thickness of the blackened layer may be adjusted in consideration of a reflectance reduction effect and an antenna radiation property.

According to the above-described exemplary embodiments, radiation properties of at least three frequency bands may be implemented from the antenna unit 200.

Figure 4:
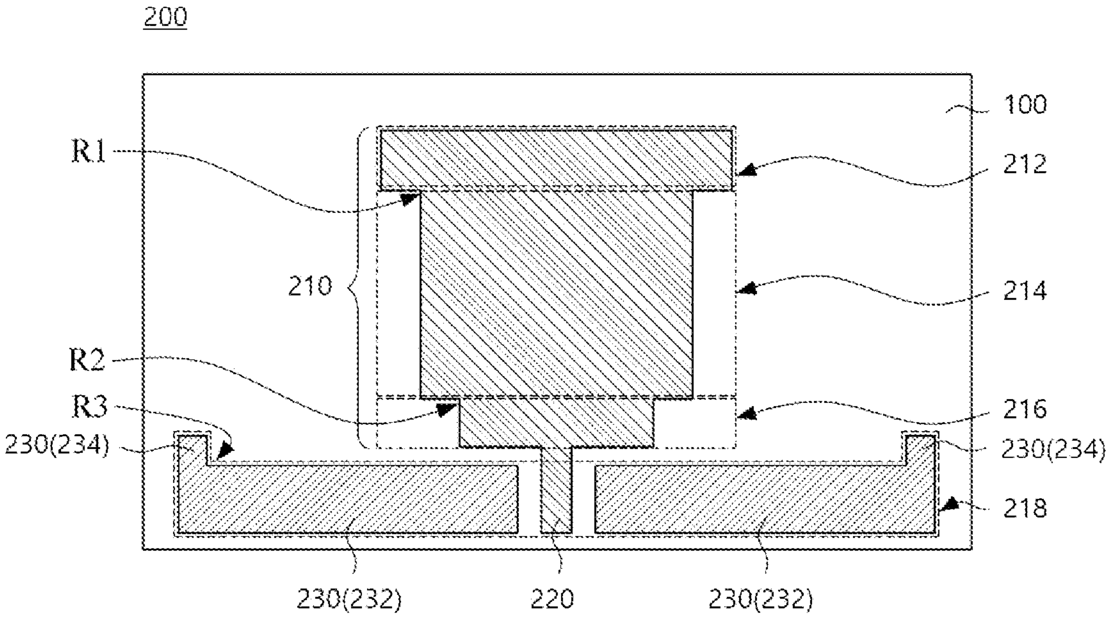
FIGS. 4 and 5 are schematic plan views illustrating an antenna unit in accordance with exemplary embodiments.
Figure 5:
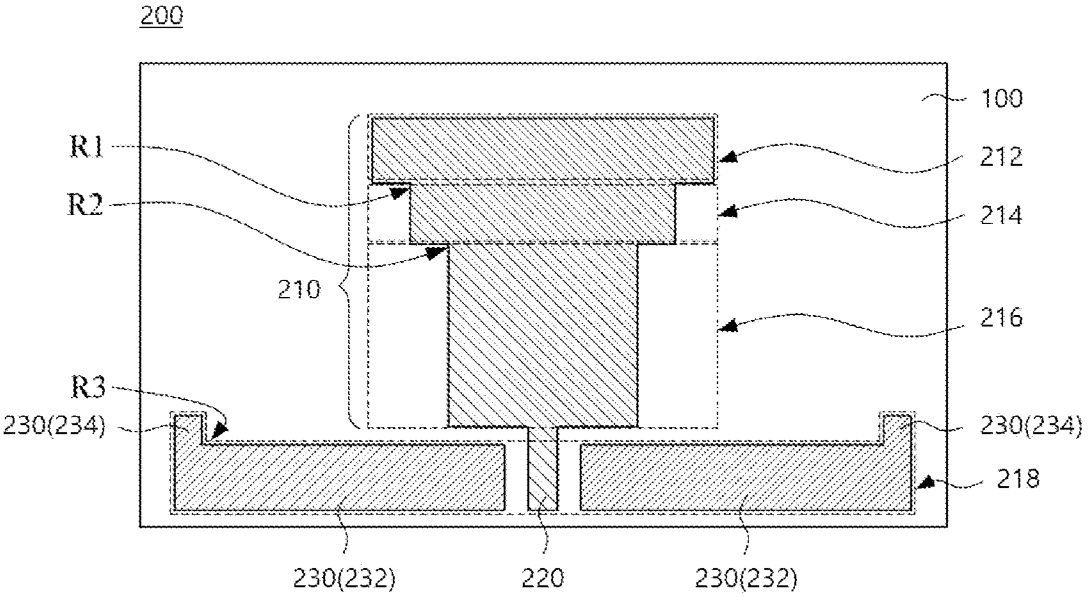

FIGS. 4 and 5 are schematic plan views illustrating an antenna unit in accordance with exemplary embodiments.

Referring to FIGS. 4 and 5, lengths of the first radiating portion 212, the second radiating portion 214 and/or the third radiating portion 216 may be properly changed/adjusted according to the target driving frequency. In exemplary embodiments, the average resonance frequency of the first radiating portion 212 may be smaller than that of the second radiating portion 214, and the average resonance frequency of the second radiating portion 214 may be smaller than that of the third radiating portion 216.

As illustrated in FIG. 4, the length of the second radiating portion 214 may be greater than each length of the first radiating portion 212 and the third radiating portion 216. In this case, the resonance frequency range of the second radiating portion 214 may be shifted in a smaller range.

As illustrated in FIG. 5 the length of the third radiating portion 216 may be greater than each length of the first radiating portion 212 and the second radiating portion 214. In this case, the resonance frequency range of the third radiating portion 216 may be shifted in a smaller range.

Figure 6:
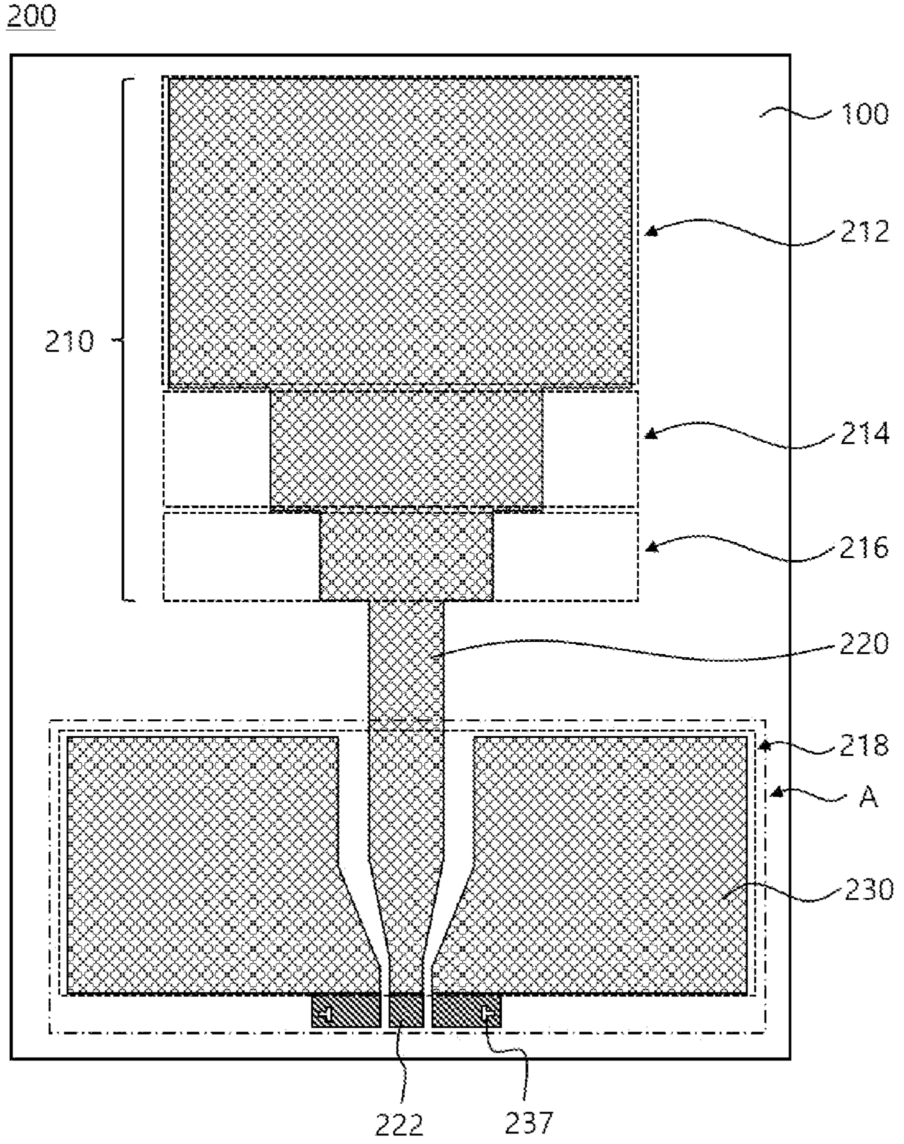
FIG. 6 is a schematic plan view illustrating an antenna unit in accordance with exemplary embodiments.
Figure 7:
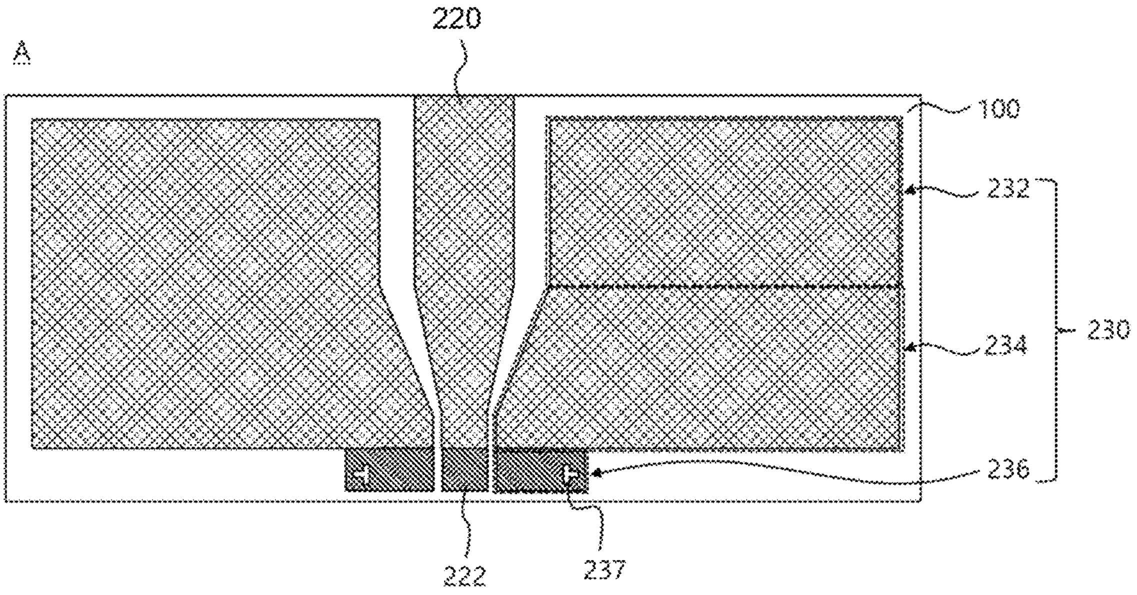
FIG. 7 is a partially enlarged plan view of a region A in FIG. 6.

FIG. 6 is a schematic plan view illustrating an antenna unit in accordance with exemplary embodiments. FIG. 7 is a partially enlarged plan view of a region A in FIG. 6.

Referring to FIGS. 6 and 7, the ground pattern 230 may include a first portion 232, a second portion 234 and a third portion 236 integrally formed with each other.

For example, the second portion 234 may include a lateral side inclined toward the transmission line 220. In this case, a distance between the ground pattern 230 and the transmission line 220 may be additionally reduced. Accordingly, signal loss transmitted from a connecting portion 222 to the radiator 210 may be suppressed.

For example, the first portion 232 may extend toward the radiator 210 in the extension direction of the transmission line 220 from the second portion 234. In an embodiment, the first portion 232 may have a rectangular shape.

The first portion 232 and the second portion 234 may serve as the fourth radiating portion 218 by, e.g., an electrical coupling with the radiator 210 and/or the transmission line 220.

For example, the third portion 236 may serve as a ground pad of the antenna unit. Accordingly, a noise generated during transmission and reception of radiation signals through the connecting portion 222 may be efficiently filtered or reduced.

For example, the third portion 236 may include an alignment mark 237. Accordingly, process reliability, precision and efficiency may be improved.

For example, the first portion 232, the second portion 234 and the third portion 236 may be integrally formed using the same material.

In some embodiments, the first portion 232 and the second portion 234 may include a mesh structure. Accordingly, the antenna unit may be prevented from being visually recognized by a user.

In some embodiments, the third portion 236 may include a solid structure. Accordingly, the noise filtering/reducing effect may be further enhanced.

Figure 8:
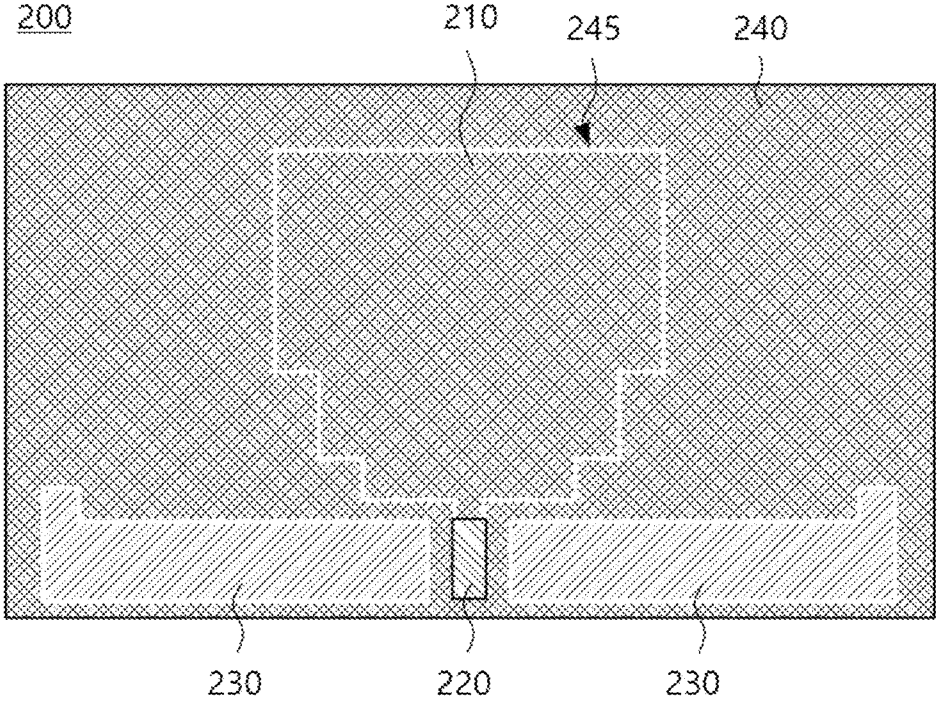
FIG. 8 is a schematic plan view illustrating an antenna unit in accordance with exemplary embodiments.

FIG. 8 is a schematic plan view illustrating an antenna unit in accordance with exemplary embodiments.

Referring to FIG. 8, the antenna unit 200 may further include a dummy mesh pattern 240 disposed around the radiator 210 and the transmission line 220. For example, the dummy mesh pattern 240 may be electrically and physically separated from the radiator 210 and the transmission line 220 by a separation region 245.

For example, a conductive layer containing the metal or alloy described above may be formed on the antenna dielectric layer 100. A mesh structure may be formed while etching the conductive layer along a circumference profile of the antenna unit 200 as described above. Accordingly, the antenna unit 200 and the dummy mesh pattern 240 spaced apart from each other by the separation region 245 may be formed.

In some embodiments, the antenna unit 200 may also share a mesh structure. Accordingly, transmittance of the antenna unit 200 may be improved, and optical properties around the antenna unit 200 may become uniform by the distribution of the dummy mesh pattern 240. Thus, the antenna unit 200 may be prevented from being visually recognized.

In an embodiment, the antenna unit 200 may entirely include the mesh structure. In an embodiment, at least a portion of the transmission line 220 may include a solid structure for enhancing a feeding efficiency.

In an embodiment, the antenna device may be applied to various objects as described above. If the ground pattern 230 is disposed in an area of an object that is not visible to a user, the ground pattern 230 may have a solid structure.

The ground pattern 230 may be formed as the solid structure so that the auxiliary radiation through the above-described coupling effect may be promoted through the ground pattern 230.

For example, when the antenna unit 200 is disposed in a non-visible area by a user in an object to which the antenna device is applied, the antenna unit 200 may include the solid structure.

The dummy mesh pattern 240 may include intersecting conductive lines forming a mesh structure. In some embodiments, the dummy mesh pattern 240 may include segmented regions (not illustrated) where the conductive lines are cut. Accordingly, the radiation properties of the antenna unit 200 may be prevented from being disturbed by the dummy mesh pattern 240.

In some embodiments, the antenna unit 200 may be disposed between a first lower dielectric layer and a first upper dielectric layer. For example, the antenna unit 200 may be sandwiched or embedded between the first upper and the first lower dielectric layers.

The first lower and upper dielectric layers may be disposed above and below the antenna unit 200, so that dielectric and radiation environments around the antenna unit 200 may become uniform.

In some embodiments, the first upper dielectric layer may serve as a coating layer, an insulating layer and/or a protective film of the antenna unit 200 or the antenna device.

In some embodiments, an antenna device may include two or more antenna units 200. For example, a plurality of the antenna units 200 may be arranged to form an array. Alternatively, a plurality of antenna units 200 may be arranged without forming an array. Accordingly, an overall gain of the antenna device may be increased.

In some embodiments, a first protective layer 300 may be formed on the antenna unit 200.

The first protective layer 300 may include, e.g., an organic insulating material and/or an inorganic insulating material.

The above-described antenna device may be applied to various structures and objects such as a window of public transportation such as a bus and a subway, a building, a vehicle, a decorative sculpture, a guidance sign (e.g., a direction sign, an emergency exit sign, an emergency light, etc.), and may serve as a relay antenna structure. The relay antenna structure may include, e.g., an access point (AP) such as a repeater, a router, a small cell, an internet router, etc.

Figure 9:
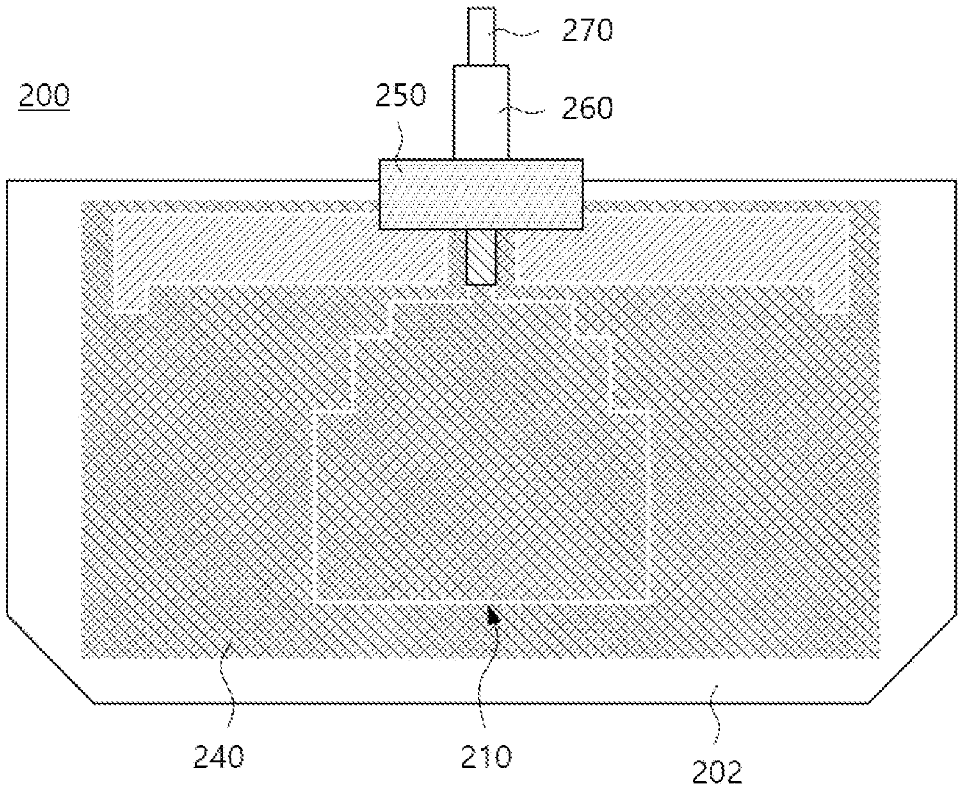
FIGS. 9 and 10 are schematic views illustrating an application of an antenna unit in accordance with exemplary embodiments.
Figure 10:
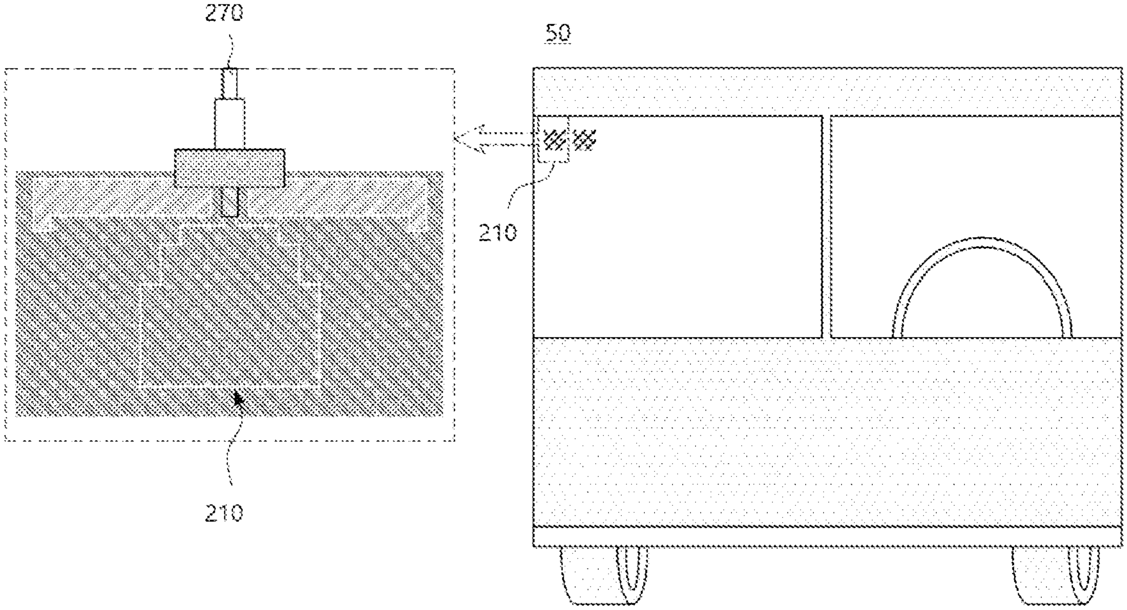

FIGS. 9 and 10 are schematic views illustrating an application of an antenna structure in accordance with exemplary embodiments. For example, FIG. 9 illustrates an antenna structure provided as a relay antenna structure. For example, FIG. 10 is a schematic diagram illustrating a router construction in which the relay antenna structure of FIG. 9 is attached to a target object 50 (e.g., a public transportation such as a bus or subway).

Referring to FIGS. 9 and 10, the antenna device may have a structure that may be fixed to a window of public transportation, a wall or a ceiling of a building structure, a window, a vehicle, a sign, etc. For example, the above-described antenna unit 200 may be inserted into or attached to a substrate 202.

For example, the substrate 202 may serve as the antenna dielectric layer 100 illustrated in FIG. 1, and the first lower dielectric layer and the first upper dielectric layer may be provided together as the substrate 202, and the antenna unit 200 may be buried in the substrate 202. The substrate 202 may serve as public transport windows, a building, various decorative structures, an instruction sign, a window, etc.

In some embodiments, the above-described antenna unit 200 and the antenna device may be attached to the substrate 202 in the form of a film.

In some embodiments, as described above, the dummy mesh pattern 240 may be formed around the antenna unit 200 to reduce or prevent a visual recognition of the antenna unit 200. At least a portion of the antenna unit 200 may also have a mesh pattern structure.

For example, a first fixing portion 250 may be coupled to one side of the substrate 202 and coupled to a feeding portion of the transmission line 220. The first fixing portion 250 may have, e.g., a clamp shape.

A second fixing portion 260 may be included in the antenna device, and may be inserted into, e.g., a wall or a ceiling to fix the antenna structure. The second fixing portion 260 may have, e.g., a screw shape.

An antenna cable 270 may be inserted into the second fixing portion 260 and the first fixing portion 250 to supply a power to a feeding portion of the antenna unit 200.

For example, the antenna cable 270 may be buried in a public transportation such as a bus or subway, an object 50 such as an inner wall of a building, a window, a sign, etc., and may be coupled with an external power source, an integrated circuit chip, or an integrated circuit board. Accordingly, the power may be supplied to the antenna unit 200 and an antenna radiation may be performed.

As illustrated in FIG. 10, the above-described antenna unit 200 may be attached to the object 50 (e.g., a window of public transportation such as a bus or subway) and may be electrically connected to a Wi-Fi repeater in the public transportation through the antenna cable 270. Accordingly, a multi-band wireless communication network may be implemented within the public transportation.

Hereinafter, the substrate layer 400 and the radiation control layer 500 will be described in detail.

In exemplary embodiments, the substrate layer 400 may serve as a substrate for the radiation control layer 500.

The substrate layer 400 may include a material substantially the same as or similar to that of the antenna dielectric layer 100.

In an embodiment, glass may be used as the substrate layer 400.

In some embodiments, a dielectric constant of the substrate layer 400 may be adjusted in a range from about 1.5 to about 12. When the dielectric constant exceeds about 12, driving in a high frequency band may not be implemented and a driving frequency may be excessively reduced.

Figure 11:
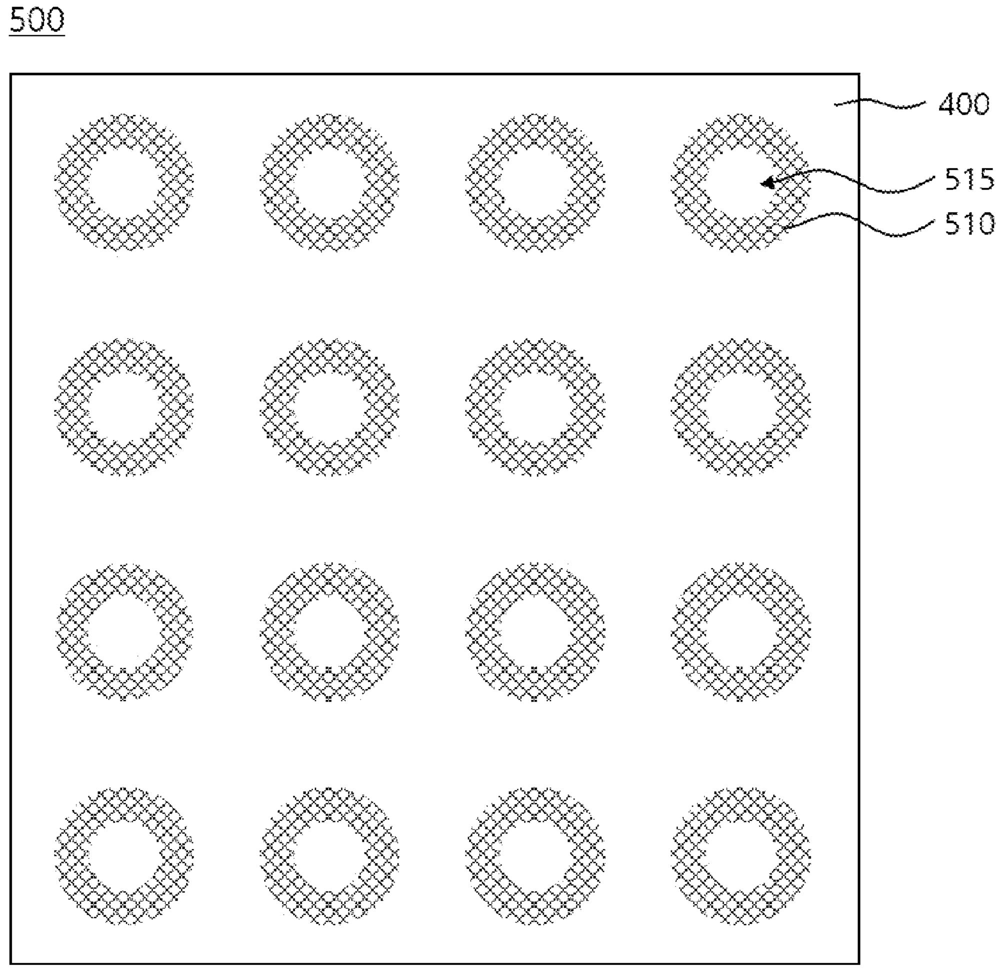
FIG. 11 is a schematic plan view illustrating a radiation control layer in accordance with exemplary embodiments.

FIG. 11 is a schematic plan view illustrating a radiation control layer in accordance with exemplary embodiments.

For example, a phase of a wavelength reflected from the ground layer 450 may be changed from a wavelength before the reflection. For example, the wavelength reflected from the ground layer 450 may have a phase difference of about 180° from the wavelength before the reflection. Accordingly, a wavelength radiated from the antenna and the wavelength reflected from the ground layer 450 may be destructively interfered, and thus an antenna gain may be decreased.

Referring to FIG. 11, the radiation control layer 500 according to exemplary embodiments of the present application may include a plurality of radiation control patterns 510 having a conductive mesh structure and including a hollow portion 515. In this case, as the wavelength reflected from the ground layer 450 may be re-reflected by the radiation control layer 500, a phase of the wavelength may be changed again. Accordingly, the destructive interference between the radiation wavelength of the antenna and the reflected wavelength from the ground layer 450 may be prevented or a constructive interference may be induced. Thus, the antenna gain may be increased and radiation reliability may be improved.

The hollow portion 515 may be formed by partially removing the conductive mesh structure. For example, a size of the hollow portion 515 may be greater than a size of each of unit cells defining the conductive mesh structure.

In an embodiment, the phase of the wavelength reflected from the ground layer 450 may be changed to −90° to +90° from the wavelength before the reflection.

The term "conductive mesh structure" used herein may refer to, e.g., a mesh structure that has a conductivity in an entire area thereof and does not include a segmented region therein.

In some embodiments, each of the radiation control patterns 510 may include the hollow portion 515. In this case, an electric field may be concentrated in a center of the radiation control pattern 510 to prevent a surface current density from being unbalanced. Thus, radiation properties and radiation reliability may be improved.

The radiation control layer 500 and the ground layer 450 may include silver (Ag), gold (Au), copper (Cu), aluminum (Al), platinum (Pt), palladium (Pd), chromium (Cr), titanium (Ti), tungsten (W), and niobium. (Nb), tantalum (Ta), vanadium (V), iron (Fe), manganese (Mn), cobalt (Co), nickel (Ni), zinc (Zn), tin (Sn), molybdenum (Mo), calcium (Ca) or an alloy containing at least one of the metals. These may be used alone or in combination of two or more therefrom.

In an embodiment, the radiation control layer 500 and the ground layer 450 may include silver (Ag) or a silver alloy (e.g., silver-palladium-copper (APC)), or copper (Cu) or a copper alloy (e.g., a copper-calcium (CuCa)) to implement a low resistance and a fine line width pattern.

In some embodiments, the radiation control layer 500 may include a transparent conductive oxide such indium tin oxide (ITO), indium zinc oxide (IZO), zinc oxide (ZnOx), indium zinc tin oxide (IZTO), etc.

In some embodiments, the radiation control layer 500 may include a stacked structure of a transparent conductive oxide layer and a metal layer. For example, the radiation control layer 500 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

Figure 12:
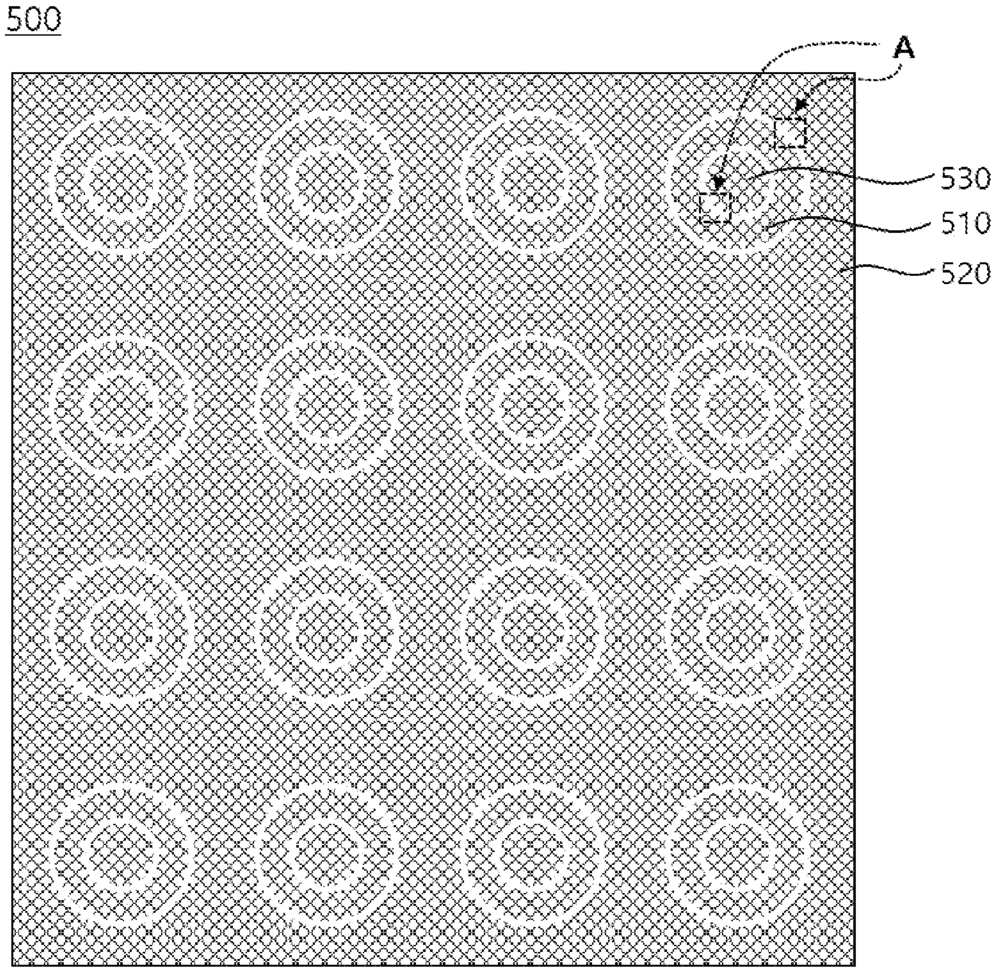
FIG. 12 is a schematic plan view illustrating a radiation control layer in accordance with exemplary embodiments.

FIG. 12 is a schematic plan view illustrating a radiation control layer in accordance with exemplary embodiments.

Referring to FIG. 12, the radiation control layer 500 may include a first dummy mesh pattern 520 surrounding peripheries of the plurality of radiation control patterns 510, and a second dummy mesh pattern 530 disposed in each hollow portion 515 of the radiation control patterns 510. For example, the radiation control patterns 510 may be prevented from being recognized by the user by the distribution of the first and second dummy mesh pattern 520 and 530. For example, the dummy mesh patterns 520 and 530 may be provided as non-conductive regions including segmental regions as described later.

Figure 13:
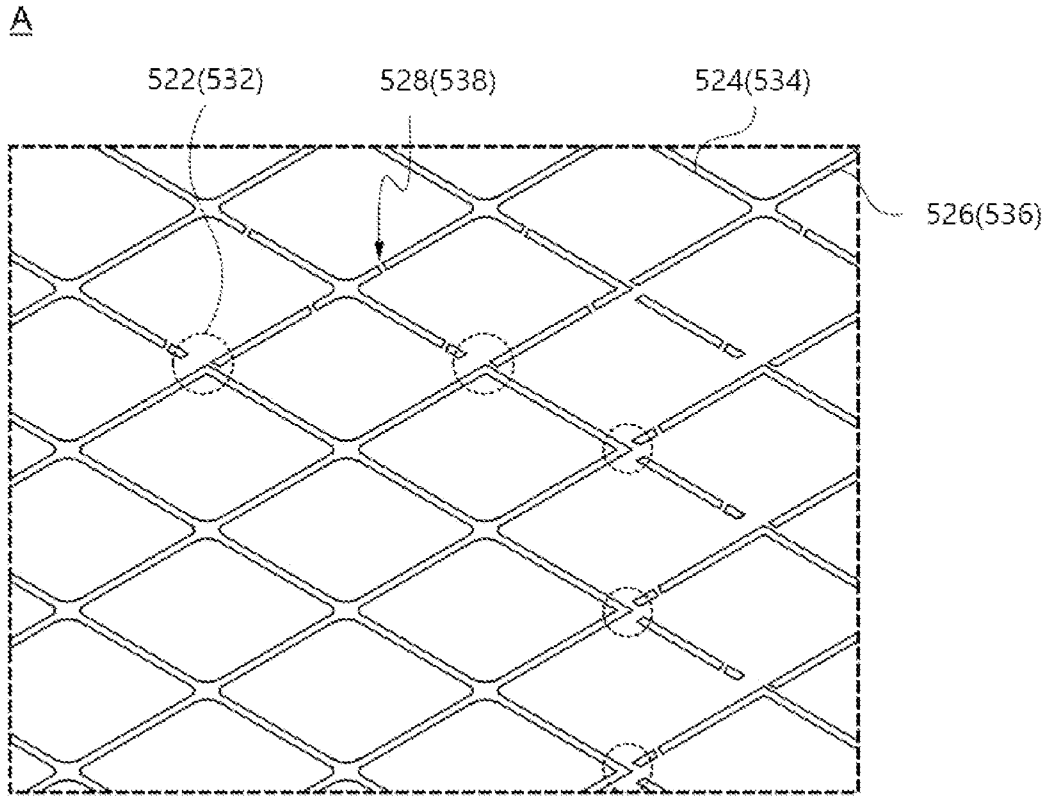
FIG. 13 is a partially enlarged plan view of a region A in FIG. 12.

FIG. 13 is a partially enlarged plan view of a region A in FIG. 12. Specifically, FIG. 13 is a schematic plan view commonly showing two areas designated as "A" in FIG. 12.

Referring to FIG. 13, the first dummy mesh pattern 520 may include first dummy conductive lines 524 and second dummy conductive lines 526 crossing each other to form a mesh structure. The second dummy mesh pattern 530 may include third dummy conductive lines 534 and fourth dummy conductive lines 536 crossing each other to form a mesh structure.

For example, the first dummy mesh pattern 520 and the radiation control patterns 510 may be electrically separated or spaced apart by first separation regions 522, and the second dummy mesh pattern 530 and the radiation control pattern 510 may be electrically separated or spaced apart from each other by a second separation region 532.

In some embodiments, the first and second dummy mesh patterns 520 and 530 may be defined by repeated unit cells.

For example, a unit cell of the first dummy mesh pattern 520 may refer to a space partitioned by the first dummy conductive lines 524 and the second dummy conductive lines 526.

For example, a unit cell of the second dummy mesh pattern 530 may refer to a space partitioned by the third dummy conductive lines 534 and the fourth dummy conductive lines 536.

For example, the unit cell may have a polygonal shape. For example, the unit cell may have a diamond shape. However, the shape of the unit cell may be changed according to the shape and arrangement of the dummy conductive lines. For example, the unit cell may have various polygonal shapes such as a pentagon and a hexagon.

In some embodiments, each of the first and second dummy mesh patterns 520 and 530 may include segmented regions where the dummy conductive lines are cut.

For example, each unit cell included in the first dummy mesh pattern 520 may include at least one first segmented region 528, and each unit cell included in the second dummy mesh pattern 530 may include at least one second segmented region 538.

In this case, generation of a parasitic capacitance due to connected metal mesh patterns may be prevented to reduce an interference with the radiation control patterns 510 and/or the antenna. Additionally, the above-described wavelength re-reflection/phase change effect may be prevented from being deteriorated by the first and second dummy mesh patterns 520 and 530.

The first and second segmented regions 528 and 538 formed in the first and second dummy mesh patterns 520 and 530, respectively, may be irregularly distributed. In this case, a moiré phenomenon caused by an overlap of regular patterns may be suppressed to reduce a visibility of electrodes.

In some embodiments, the conductive mesh structure included in each of the plurality of radiation control patterns 510 may not include segmented regions where the conductive lines are cut. Accordingly, the reflection/phase change effect of the radiation control patterns 510 may be effectively implemented.

In some embodiments, the plurality of radiation control patterns 510 may be spaced apart from each other at a regular interval on a top surface of the substrate layer 400. In this case, the above-described reflection/phase change effect of the radiation control patterns 510 may be enhanced by the regular arrangement of the radiation control patterns 510 having substantially the same shape.

In some embodiments, the plurality of radiation control patterns 510 may be irregularly arranged on the top surface of the substrate layer 400 according to a target frequency and an antenna gain.

In some embodiments, each of the radiation control patterns 510 may have a hollow circle shape or a hollow polygon shape.

The term "hollow circle" used herein may refer to a shape including a hollow portion within a circular shape.

The term "hollow polygon" used herein may refer to a shape including a hollow portion within a polygonal shape.

In an embodiment, each of the radiation control patterns 510 may have the hollow circle shape (e.g., a donut shape). In this case, a distance from a center to an outermost portion of the radiation control pattern 510 may be substantially the same in all directions, so that a uniform surface current density may be implemented throughout an entire radiation control pattern 510.

In an embodiment, each of the control patterns 510 may have a circular shape devoid of a hollow portion or a polygonal shape (e.g., a quadrangle, a pentagon, a hexagon, etc.) devoid of a hollow portion. For example, the shape of the radiation control patterns 510 be properly modified in consideration of radiation properties.

In some embodiments, the ground layer 450 may include a mesh structure. In this case, the antenna device may be entirely formed of a transparent material or a visibility reducing material. Accordingly, the radiation control layer 500 or the ground layer 450 may be prevented from being visually recognized by the user and degrading aesthetics.

In some embodiments, a second protective layer 600 may be formed on the radiation control layer 500.

The second passivation layer 600 may include, e.g., an organic insulating material and/or an inorganic insulating material.

In some embodiments, the antenna unit 200 and the radiation control patterns 510 may overlap in a plan view or a thickness direction.

For example, an area where the antenna unit 200 and the radiation control patterns 510 overlap in the plan view may be 50% or more of a total area of the antenna unit 200. Within the overlapping area range, the radiation control patterns 510 may prevent the destructive interference or induce the constructive interference between the antenna radiation wavelength and the ground layer reflection wavelength. Accordingly, the antenna gain may be increased, and radiation reliability may be improved.

For example, the "area where the antenna unit 200 and the radiation control patterns 510 overlap in the plan view" may refer to an area where the radiator 210, the transmission line 220 and the ground pattern 230 included in the antenna unit 200, and the plurality of the radiation control patterns 510 overlap in the plan view.

For example, the "area where the antenna unit 200 and the radiation control patterns 510 overlap in the plan view" may refer to an area where a minimum imaginary quadrangle including the radiator 210, the transmission line 220 and the ground pattern 230, and the plurality of the radiation control patterns 510 overlap in the plan view.

In an embodiment, an area where the antenna unit 200 and the radiation control patterns 510 overlap in the plan view may be 65% or more of the total area of the antenna unit 200.

Figure 14:
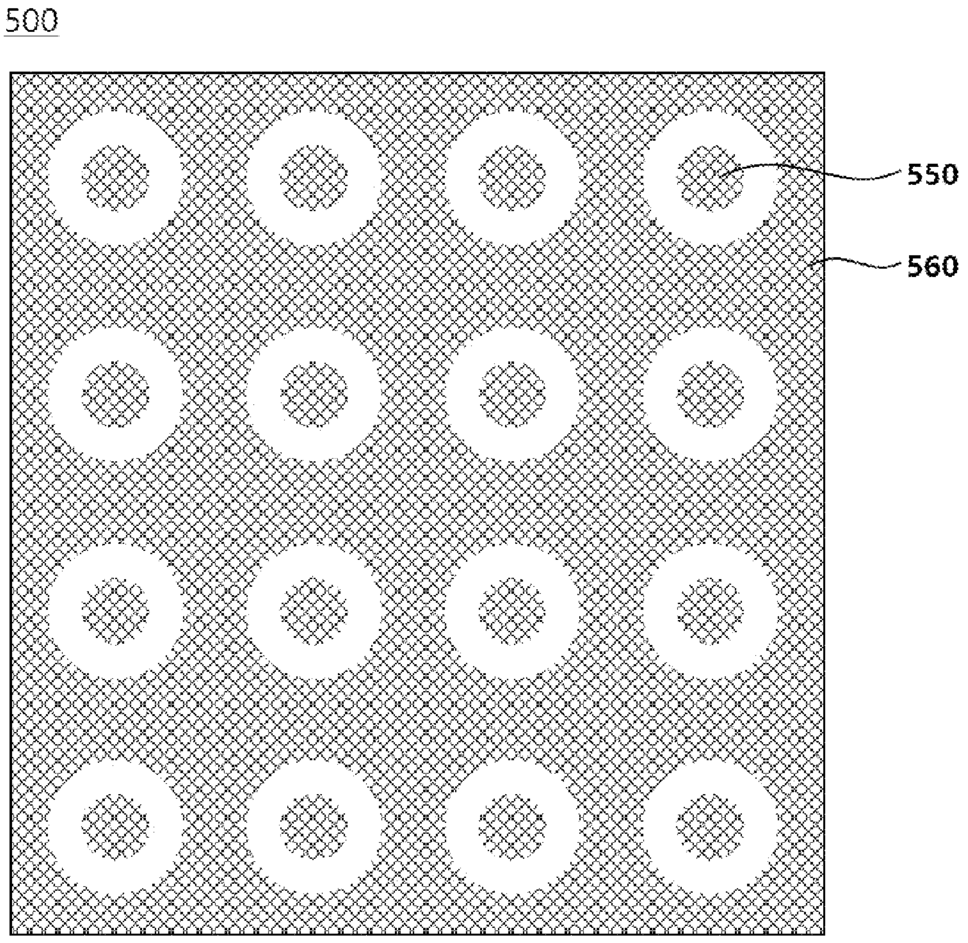
FIGS. 14 and 15 are schematic plan views illustrating radiation control layers in accordance with exemplary embodiments.
Figure 15:
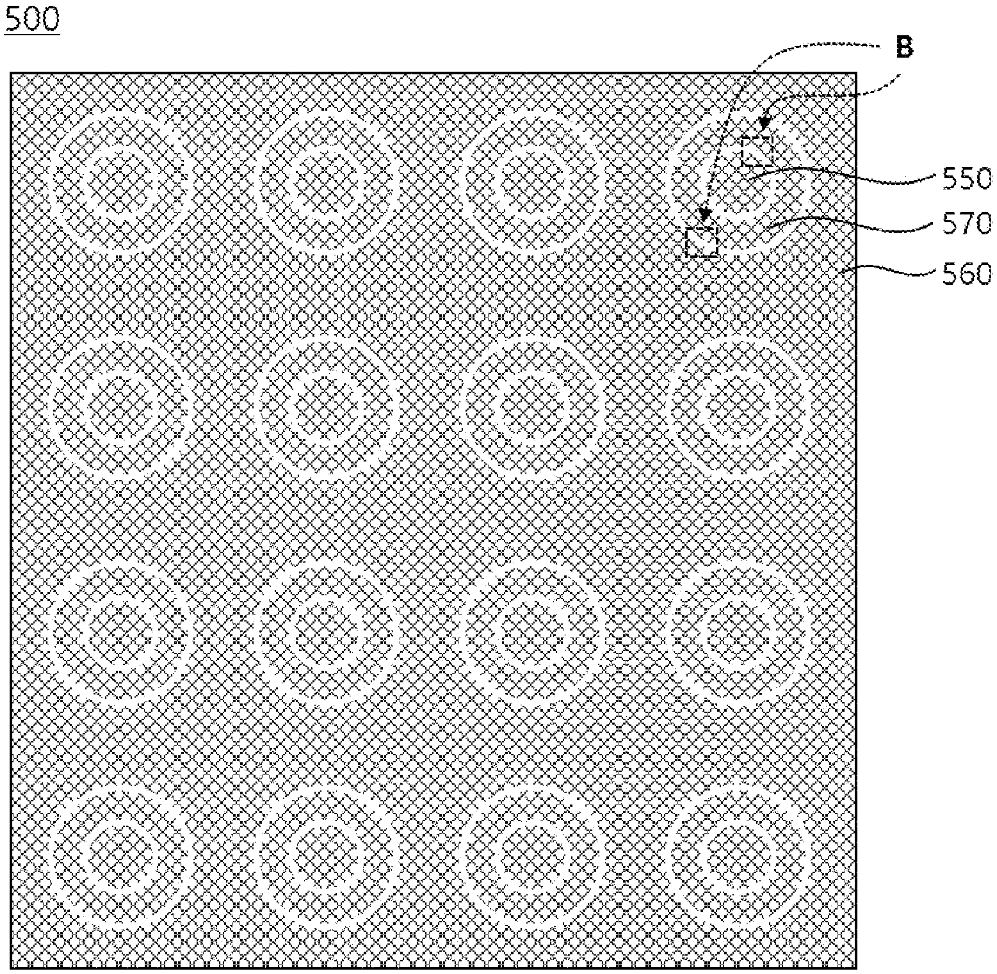

FIGS. 14 and 15 are schematic plan views illustrating radiation control layers in accordance with exemplary embodiments.

Referring to FIG. 14, the radiation control layer 500 may include a plurality of first patterns 550 each including a conductive mesh structure and a second pattern 560 surrounding the first patterns 550 and being spaced apart from the first patterns 550.

The first patterns 550 and the second pattern 560 may include the conductive mesh structure. In this case, the radiation control layer 500 may serve as a filter that transmits only a wavelength in n a target frequency band. Thus, radiation properties including radiation concentration may be improved.

In some embodiments, each of the plurality of first patterns 550 may have a circular shape or a polygonal shape. In an embodiment, each of the first patterns 550 may have a circular shape. In this case, a distance from a center of the first pattern 550 to an outermost periphery may be substantially the same in all directions, so that a uniform surface current density may be implemented throughout the first pattern 550.

Referring to FIG. 15, the radiation control layer 500 may further include a third dummy mesh pattern 570 disposed between the first pattern 550 and the second pattern 560. For example, the third dummy mesh pattern 570 may have a hollow circle shape or hollow polygon shape. In an embodiment, the third dummy mesh pattern 570 may have the hollow circle shape. A visual recognition of the radiation control layer 500 may be further prevented by the third dummy mesh pattern 570.

Figure 16:
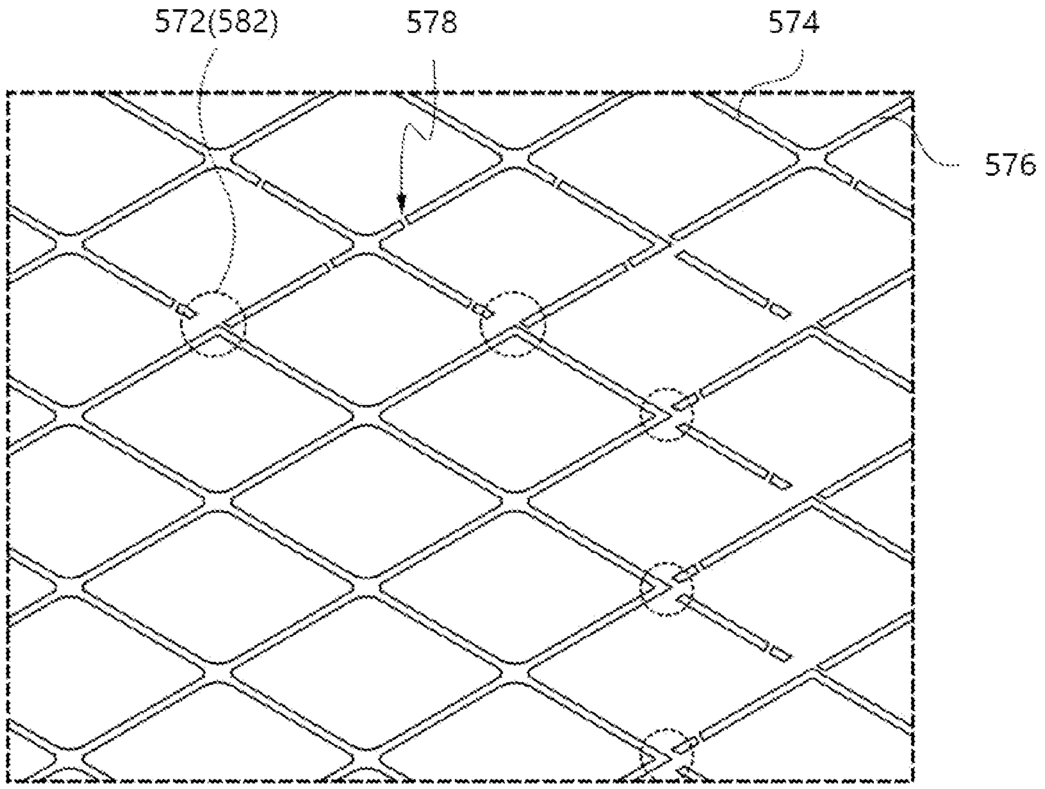
FIG. 16 is a partially enlarged plan view of a region B in FIG. 15.

FIG. 16 is an enlarged schematic plan view of a region B of FIG. 15. Specifically, FIG. 16 is a schematic plan view commonly showing two regions designated as "B" in FIG. 15.

Referring to FIG. 16, the third dummy mesh pattern 570 may include fifth dummy conductive lines 574 and sixth dummy conductive lines 576 crossing each other to form a mesh structure.

For example, the third dummy mesh pattern 570 and the first patterns 550 may be electrically separated or spaced apart by a third separation region 572, and the third dummy mesh pattern 570 and the second pattern 560 may be electrically separated or spaced apart by a fourth isolation region 582.

In some embodiments, the third dummy mesh pattern 570 may be defined by repeated unit cells.

For example, a unit cell of the third dummy mesh pattern 570 may refer to a space partitioned by the fifth dummy conductive lines 574 and the sixth dummy conductive lines 576.

For example, the unit cell may have a polygonal shape. For example, the unit cell may have a diamond shape. However, the shape of the unit cell may be changed according to the shape and arrangement of the dummy conductive lines. For example, the unit cell may have various polygonal shapes such as a pentagon and a hexagon.

In some embodiments, the third dummy mesh pattern 570 may include segmented regions where the dummy conductive lines are cut.

For example, each unit cell included in the third dummy mesh pattern 570 may include at least one third segmented region 578. In this case, generation of a parasitic capacitance due to a connected metal mesh structure may be prevented to reduce interference with the radiation control patterns 510 and/or the antenna.

In some embodiments, the conductive mesh structures included in each of the first patterns 550 and second patterns 560 may include conductive lines crossing each other to form a mesh structure. In this case, the conductive mesh structure may not include segmented regions where conductive lines are cut. Accordingly, an effect of transmitting a radio wave corresponding to a target frequency band of the radiation control layer 500 may be implemented.

Figure 17:
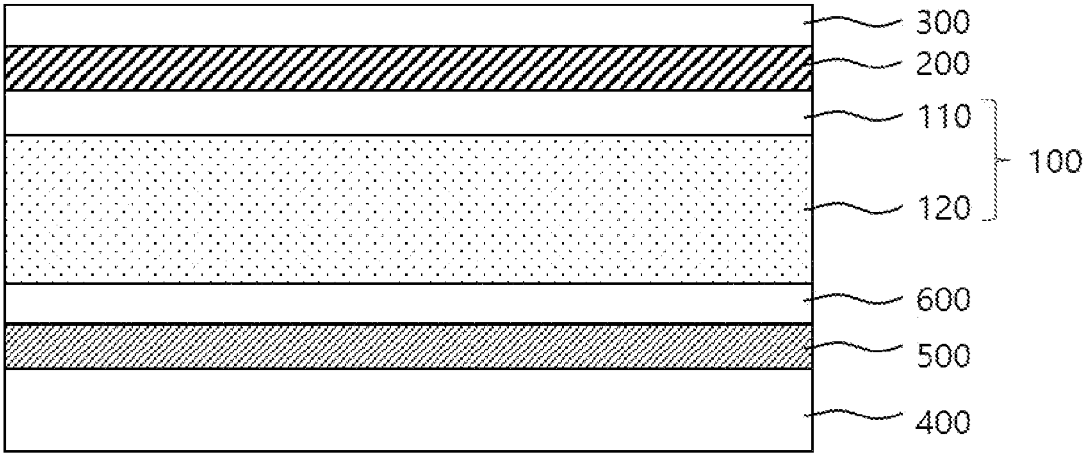
FIG. 17 is a schematic cross-sectional view illustrating an antenna device in accordance with exemplary embodiments.

FIG. 17 is a schematic cross-sectional view illustrating an antenna device in accordance with exemplary embodiments.

Referring to FIG. 17, in an embodiment of the radiation control layer 500 including the first patterns 550 and the second pattern 560, the ground layer may not be on the bottom surface of the substrate layer 400. In this case, a radiation wavelength in a target frequency band may be prevented from being absorbed by the ground layer. Accordingly, a rapid reduction of the antenna gain may be avoided.

As described above, the antenna device according to exemplary embodiments may include the antenna unit 200 and the radiation control layer 500. Thus, radiation performance at a target frequency may be improved while implementing the multi-band radiation.

As described above, the radiation control layer 500 may be included in the antenna device to prevent the destructive interference between the radiation wavelength of the antenna unit and the reflection wavelength of the ground layer, or may induce the constructive interference.

For example, the antenna element may be applied to various structures and objects, such as windows, buildings, windows, vehicles, decorative sculptures, guidance signs (e.g., direction signs, emergency exit signs, emergency lights) of public transportation such as buses and subways. It may be applied, and may be provided as a relay antenna structure, for example. The relay antenna structure may include, for example, an access point (AP) such as a repeater, a router, a small cell, and an internet router.

The radiation control layer 500 described above may block or change the phase of a wavelength reflected from an object to which the antenna element is attached. Accordingly, antenna gain can be improved and radiation reliability can be improved.

For example, the antenna device may be applied to various structures and objects such as a window of public transportation such as a bus and a subway, a building, a vehicle, a decorative sculpture, a guidance sign (e.g., a direction sign, an emergency exit sign, an emergency light, etc.), and may serve as a relay antenna structure. The relay antenna structure may include, e.g., an access point (AP) such as a repeater, a router, a small cell, an internet router, etc.

Blocking or phase-shifting of a wavelength reflected from the object to which the antenna device is attached may be implemented by the above-described radiation control layer 500. Accordingly, the antenna gain may be improved and radiation reliability may be enhanced.

What is claimed is:

1. An antenna device comprising:

a substrate layer having a top surface and a bottom surface opposite to the top surface;

a ground layer disposed on the bottom surface of the substrate layer;

a radiation control layer disposed on the top surface of the substrate layer, the radiation control layer comprising a plurality of radiation control patterns formed of a conductive mesh structure, each of the radiation control patterns having a hollow portion;

an antenna dielectric layer disposed on the radiation control layer; and an antenna unit disposed on the antenna dielectric layer.

2. The antenna device according to claim 1, wherein the antenna dielectric layer comprises a first dielectric layer directly contacting a bottom surface of the antenna unit, and a second dielectric layer disposed on a bottom surface of the first dielectric layer, and a thickness of the second dielectric layer is greater than a thickness of the first dielectric layer.

3. The antenna device according to claim 2, wherein the thickness of the second dielectric layer is in a range from 1 mm to 10 mm.

4. The antenna device according to claim 1, wherein an area where the antenna unit and the radiation control patterns overlap in a plan view is 50% or more of a total area of the antenna unit.

5. The antenna device according to claim 1, wherein the antenna unit comprises:

a radiator comprising a plurality of radiating portions, width of which are sequentially reduced;

a transmission line electrically connected to the radiator; and a ground pattern disposed around the transmission line and physically spaced apart from the radiator and the transmission line.

6. The antenna device according to claim 5, wherein the plurality of radiating portions comprise a first radiating portion, a second radiating portion and a third radiating portion, widths of which are sequentially reduced.

7. The antenna device according to claim 6, wherein the first radiating portion, the second radiating portion and the third radiating portion are arranged in a stepped shape, and the transmission line is directly connected to the third radiating portion.

8. The antenna device according to claim 6, wherein a length of the first radiating portion, a length of the second radiating portion and a length of the third radiating portion are different from each other.

9. The antenna device according to claim 5, wherein the ground pattern comprises a pair of ground patterns facing each other with the transmission line interposed therebetween and each including a protrusion.

10. The antenna device according to claim 9, wherein each of the pair of ground patterns comprises a ground portion extending in a width direction around the transmission line, and the protrusion extends from the ground portion toward the radiator in an extending direction of the transmission line.

11. The antenna device according to claim 5, wherein the ground pattern comprises:

a second portion having a lateral side inclined toward the transmission line;

a first portion extending from the second portion toward the radiator in an extending direction of the transmission line; and a third portion protruding from the second portion and including an alignment mark.

12. The antenna device according to claim 1, wherein the radiation control layer further comprises:

a first dummy mesh pattern surrounding peripheries of the radiation control patterns; and a second dummy mesh pattern disposed in a hollow portion formed in each of the radiation control patterns.

13. The antenna device according to claim 12, wherein each of the first dummy mesh pattern and the second dummy mesh pattern comprises dummy conductive lines crossing each other to form a mesh structure, and segmented regions where the dummy conductive lines are cut.

14. An antenna device comprising:

a substrate layer;

a radiation control layer disposed on a top surface of the substrate layer, the radiation control layer comprising a plurality of first patterns each having a conductive mesh structure and a second pattern spaced apart from the first patterns to surround the first patterns;

an antenna dielectric layer disposed on the radiation control layer; and an antenna unit disposed on the antenna dielectric layer.

15. The antenna device according to claim 14, wherein the second pattern has a conductive mesh structure.

16. The antenna device according to claim 14, wherein the radiation control layer further comprises a third dummy mesh pattern disposed between the first patterns and the second pattern.

17. The antenna device according to claim 16, wherein the third dummy mesh pattern has a hollow circle shape.

18. The antenna device according to claim 14, wherein a ground layer is not disposed on a bottom surface of the substrate layer.

* * * * *